Jan. 13, 1953    C. G. WESTWOOD    2,624,964
MULTIPLE BUCK GARMENT PRESSING MACHINE
Filed July 26, 1947    2 SHEETS—SHEET 2
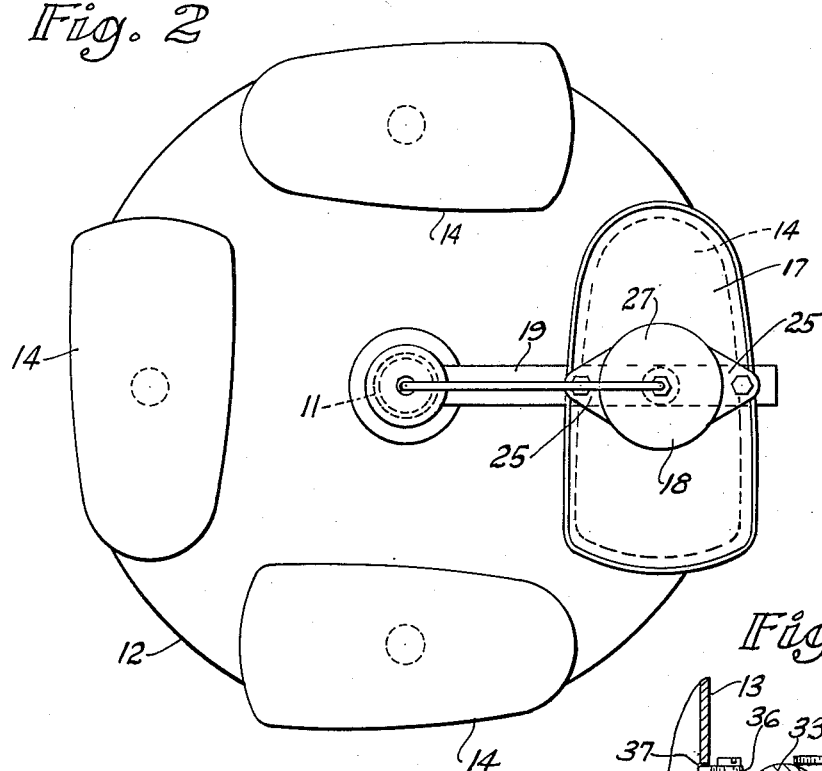
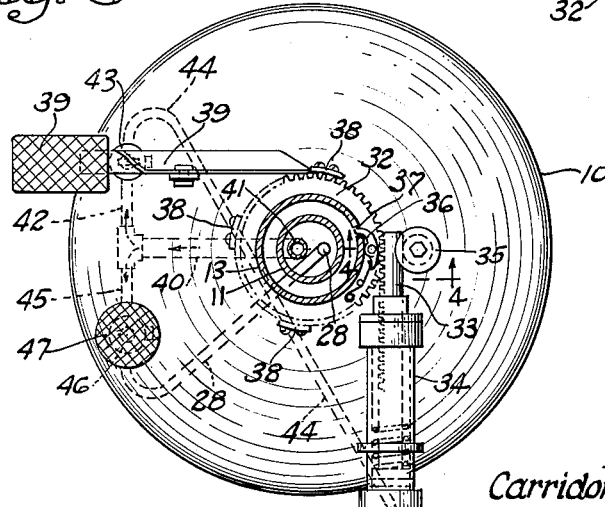
INVENTOR
Carridon G. Westwood
BY
Theis, Olson & Mecklenburger
Attorneys Patented Jan. 13, 1953

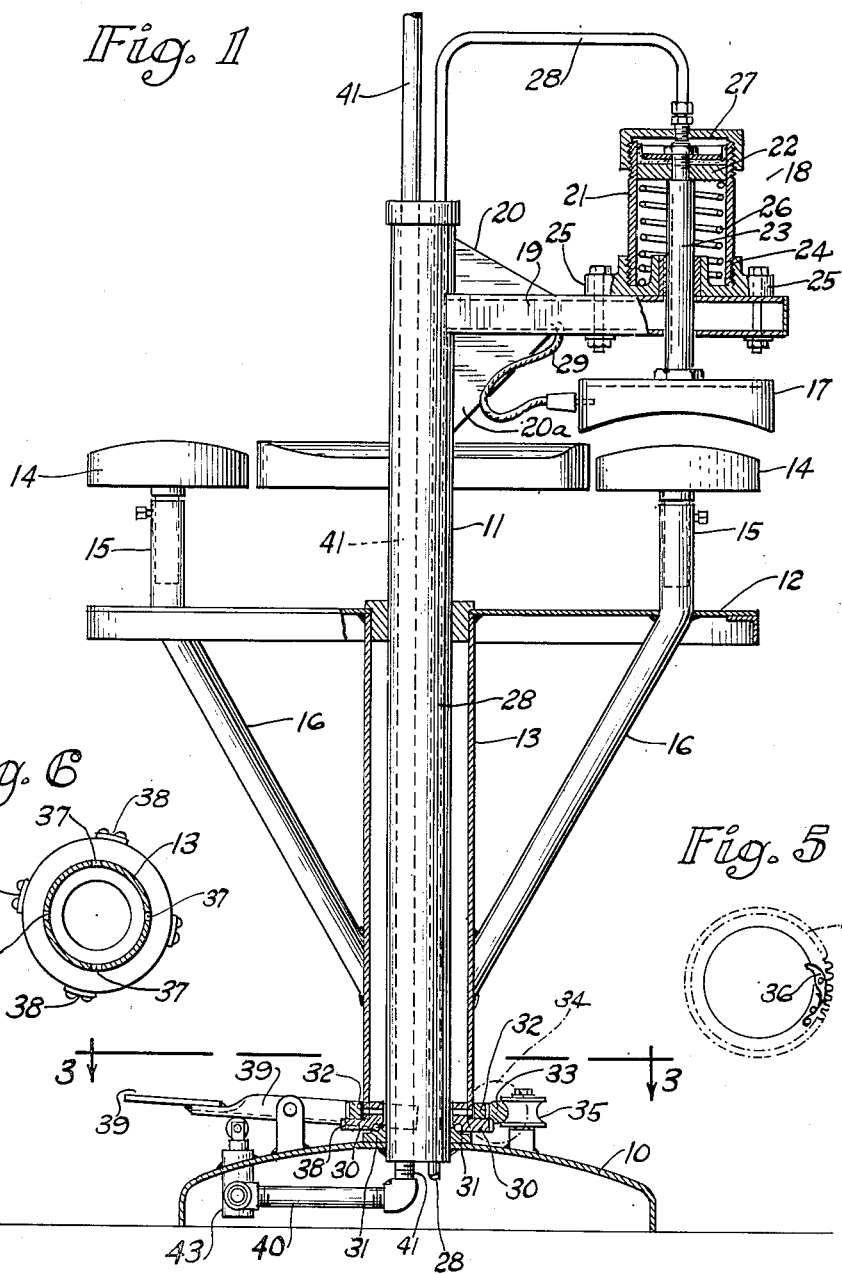
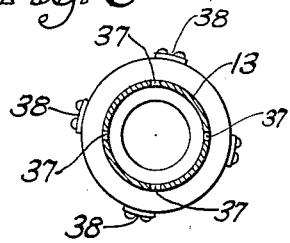
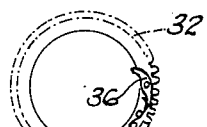

2,624,964

UNITED STATES PATENT OFFICE 2,624,964

MULTIPLE BUCK GARMENT PRESSING MACHINE

Carridon G. Westwood, South Bend, Ind., assignor to G. H. Bishop Company, Chicago, Ill., a corporation of Illinois Application July 26, 1947, Serial No. 763,880

1 Claim. (Cl. 38—22)

This invention relates to pressing machines for laundries and cleaning plants, a general object being to provide a machine for pressing small garments, such as children's dresses, and garments and other articles which are too small readily and efficiently to be pressed on the large machines with which the plants are usually equipped.

A further object is to provide such a machine which is easily and comfortably operated and capable of turning out the work rapidly and efficiently.

A further object is to provide a pressing machine with supporting means carrying a plurality of bucks in a cycle for receiving the garments and a presser head at one point in the cycling movement of the bucks to engage and press the garment on the buck then in register therewith.

Another object is to provide a pressing machine with a rotatable table carrying a plurality of bucks for receiving the garments and a presser head at one side of the table to engage and press the garments on the respective bucks as they are brought into register therewith, the operator's position being on the other side of the table from the head and therefore away from the pressing operation.

Another object is to provide a simple machine having a rotatable table carrying a plurality of bucks to receive the garments to be pressed and a presser head at one side to engage and press the garments on the bucks as they are brought into line therewith, the table and head being power-operated, the controls of which, preferably in the form of pedals, being located on the other side of the table from the head, whereby the operator is stationed away from the pressing operation and may be seated at the operator's position and the machine thus be especially adapted for woman operation.

Further objects and advantages will appear from the description and claim to follow, in connection with the accompanying drawings which illustrate, by way of example and not of limitation, an embodiment of the invention, and in which—

Fig. 1 is a side elevation of the machine, parts being in section to show the construction;

Fig. 2 is a plan view of the same;

Fig. 3 is a horizontal cross section on the line 3—3 of Fig. 1 showing the arrangement at the base of the machine;

Fig. 4 is a sectional detail rack and gear at the base taken on the line 4—4 of Fig. 3;

Fig. 5 is a separate view of the ring gear at the base; and

Fig. 6 is a plan view of the annular member in the lower end of the table-supporting hollow pipe and which forms the upper member of the ball bearing at the bottom of the tube.

Referring to these drawings, the machine frame includes a base 10 to which a vertical hollow pipe standard 11 is secured, as by welding or otherwise. A circular sheet-metal table 12 surrounds this standard and is rotatable thereabout. It has a hollow tubular central support 13 surrounding the standard 11, the upper end of which is secured, as by welding, to the table top or disc 12 and is fitted with a sleeve bearing in its upper end around the standard 11. At its lower end the tubular support 13 is carried in a suitable thrust roller-bearing relation to the standard 11 and base 10, to be described later. Thus, the table 12 is rotatably mounted on the standard 11 of the machine.

The table carries on its upper face a plurality of presser bucks 14, to wit, four, at 90 degrees apart, which have central stems on their undersides fitting into the upper ends of pipes 15 supporting the bucks on and above the table. Since these bucks receive the impacts of the presser head, to be described, in the pressing operation, they are conveniently braced thereagainst by continuing the pipes through the table to which they are welded and thence by their slanting portions 16 to the pipe 13, as indicated, and to which they are secured, as by welding. There is thus a brace under the table for each buck.

The presser head 17 is carried and operated by a fluid-pressure cylinder 18 mounted on an arm 19 secured to and projecting laterally from the standard 11 adjacent the upper end thereof. The arm may be of sheet metal in tubular form, rectangular in cross section, and welded to the standard at its inner end and braced by the triangular plates 20 and 20a welded to both arm and standard above and below the arm, whereby to provide a strong, rigid support for the cylinder and head. The fluid-pressure cylinder 18 consists of a cylinder 21, a piston 22 therein with suitable gasket disc and washer on top, and a piston rod 23 secured at its upper end to the piston, gasket and washer by the shouldered threaded extension thereof and nut, in the usual manner. The piston rod passes through a suitable bearing in the lower casting head of the cylinder, having a key or spline and groove connection therewith to prevent rotation of the piston rod in the cylinder head. The presser head 17 is suitably and rigidly mounted on the lower end of the piston rod 23 so as to be carried and operated thereby for pressing the garments on the buck below. It is mounted on the rod in a manner to prevent rotation thereon and the rod cannot rotate in the cylinder, so that the head and bucks, which are oblong, maintain proper contactual and working relations.

The cylinder head casting 24 into which the cylinder 21 is threaded is provided with lugs 25 by which it is firmly and securely bolted to the arm 19. A coil spring 26 within the cylinder returns the piston and head to the upper position when the fluid pressure on top of the piston is released. The cap 27 of the cylinder, which is threaded thereon, is provided with a threaded coupling to connect the working pressure chamber of the cylinder with the fluid-pressure supply pipe 28 which extends over to the top of the standard 11 and extends down through the same to the base 10, where it is connected to a control valve and to the main supply pipe, as will be explained.

The presser head 17 is electrically heated in the well-known manner by heating elements therein and is connected for the purpose by the conductor cord 29 with a suitable current source, such as the power circuit in the plant. This cord 29 may enter the hollow arm 19 and be carried through it and the standard 11 to the top or to the base, as may be most convenient, for connection with the power or light circuit of the plant wherein the machine is used.

At the base of the machine, means are provided for moving the table around in 90° steps to bring the bucks serially around into register with the head and afford the operator on the other side of the machine opportunity to remove the pressed garments from the bucks and to place others on the empty bucks to be pressed. As before said, the center column 13 of the table is supported on a roller bearing. This bearing comprises the upper ring-like member 30 and the lower ring member 31, with the ball races and balls suitably between them. The lower member is secured to the base and the standard 11 or carried thereby. The upper member 30 has a shouldered portion on its upper side projecting into the lower end of the sleeve 13, and the sleeve or pipe is firmly and nonrotatively secured thereto. This upper ring 30 projects outside the pipe 13 and carries on its upper surface a ring gear 32, shown separately in Fig. 5, in plan in Fig. 3, and in enlarged section in Fig. 4. This ring gear is free to rotate or reciprocatingly rotate on the member 30 and pipe 13. That is, it is not attached thereto but is free to rotate thereon in either direction. The outer periphery of this ring gear is provided with gear teeth which mesh with a rack gear 33 on the side of the piston or extension thereof of a fluid-pressure cylinder 34 with inner spring return for the piston mounted on the base. A grooved roller 35 guides the outer end of piston 33 and holds its rack in operative relation with the ring gear. Fluid pressure admitted to the cylinder back of the piston and the spring return of the piston result in the rotative reciprocation of the ring through approximately a 90° arc. On the upper side of the ring is pivoted a spring-pressed dog or pawl 36, the free end of which presses against and rides upon the outside of the table leg or tube 13 until it reaches one of the four holes or notches 37, 90° apart, in the said tube. It then drops into the hole and upon pressure being supplied to the cylinder the pawl rotates the tube and thus the whole table a quarter of a turn. When the pressure is released, the spring returns the piston, the ring is drawn back, the pawl withdraws from the hole in the column 13 and travels back to engage in the next hole. Thus, the table is rotated step by step, a quarter of a turn at each step. In order that the stopping or indexing of the table in the right position at the end of the step may be made positive, so that the bucks on the table may be sure to register with the head in the pressing position, small lugs 38 may be secured to the peripheral edge of the ring 30, which is secured to the lower end of the tube 13 of the table structure. These lugs are adapted to be engaged by the inner end of foot pedal 39 when the pedal is not depressed, as indicated in Figs. 1 and 3, and, as will be explained, this condition prevails when the table is to be stopped. Upon depression of the foot pedal, the stop 38 is freed and the table may be rotated. This, as will appear, occurs when the pressure is admitted to the cylinder 34 to step the table around.

While the pressure cylinders may be operated by any fluid pressure with proper valves and connections therefor, it is preferred in this instance to operate the same by compressed air, with which most plants are supplied. Accordingly, in the base of the machine the pipe 40 is connected to such plant supply in any convenient way. As shown, the pipe 41 leads therefrom up through the standard 11, since the supply pipes in plants are most often overhead, to be there connected with such source. But such connection to the supply system of the plant or other source may be made in the base of the machine, if desired.

As may be seen in Fig. 3, the supply pipe 40 is connected by a branch pipe 42 with a suitable control valve 43, and the latter by pipe 44 with the cylinder 34 for operation of the table by the rack and ring gear above described. Another branch pipe 45 leads from the supply pipe 40 to a valve 46 and the valve is connected to the lower end of pipe 28, which passes up through the standard 11 to the pressing cylinder 18.

These valves 43 and 46, which are not shown in detail, are simple, well-known, spring-return, sliding piston air valves having passages and ports to connect the source of supply with the pipe leading to the cylinder to be operated when the piston is manually depressed against the force of the spring, and to close the supply passage and connect the cylinder pipe to an exhaust port when the piston is relieved of the manual pressure and is returned or raised by its spring to normal position. They are frequently termed three-way valves.

The foot pedal 39 pivoted on the base 10 bears upon the end of the piston of valve 43 to depress it to connect the cylinder 34 with the air-pressure supply to rotate the table. At the same time, the other end of the pedal lever is raised from the stop 38 to permit the table to rotate. The piston of valve 46 carries merely a round pedal or button 47 on its upper end to depress it by the foot of the operator. In each case the spring in the valve returns the pedal to normal raised position when the foot of the operator is removed therefrom. By repeated operations of the pedal 47 the presser head 17 may be caused to repeat its strokes and pressings on the garment. The length of time of such pressings may also be controlled by keeping the pedal 47 depressed as long as desired. The time of release of the pedal 39 to engage the stop 38 to stop the table does not have to be exact. If released considerably before, the momentum of the rotating table and its parts may be relied on to carry the stop around until engaged even through the pressure has been cut off the cylinder 34, the pawl 36 automatically withdrawing from the hole 37 in the tube 13. Even if something did go wrong with these parts, the table could still be turned by hand by the operator, the treadle 39 and the stops 36 serving as an index device properly to position the bucks under the head.

The operation of the apparatus so far described is thought to be clear. The foot treadles are easily operated and are located on the opposite side of the machine from the pressing head. This is liked by women operators particularly, since they are away from the machinery and heat of the pressing head, and may be seated on a stool or the like while operating the machine. The garments to be pressed are placed and arranged on the bucks before her and therefore away from all danger, real or fancied, and away from the heat, steam, etc., of the pressing operation, and yet is within sight for inspection as to how the work is going. The pressed garments are removed from the bucks and table as they come around. An advantage in the quarter or 90-degree steps instead of a half circle or 180-degree of the table is that the table does not move so far at each step or get to going so fast, which might be bewildering and disconcerting to the operators and result in fear and loss of efficiency. Besides, by looking over the side bucks, a better supervision of the work is possible. As explained, the operator removes the pressed garment and places an unpressed one on the buck before her. Meanwhile, she operates the treadle 47 to operate the cylinder 18 and presser head 17. When this is done, she releases the pedal 47 and depresses pedal 39. This steps the head around and removes the pressed garment from under the head, and brings another presser head before her. The operation is then repeated. There is no placing of the garment on the buck by hand while under the heated head. The head does not have to lift above the work further than necessary for the buck with the article draped on it to move sidewise thereunder. A short-stroke cylinder with inside spring may be used.

The table 12 being circular and the bucks 14 substantially within its perimeter, radially considered, the operator is in no danger of being struck by the bucks in the rotation of the table, as would be the case if no table were present. The bucks are liable to be quite hot, particularly after the pressing operation.

A further advantage of the 90° steps or four stop positions of the turret or table carrying the bucks is the rest stops or periods provided between the operator's position and the pressing position. Thus, designating the four stop positions as: 1, the operator's position; 2, the rest period before passing to the press; 3, the pressing position; and 4, the rest or evaporating or drying position following the pressing, the first rest position, No. 2, gives a chance for the moisture to spread uniformly in the garment—similar to the rolling operation of a garment after sprinkling in home laundering—and for the garment to flatten out on the buck and be properly conditioned, as it is termed, for ironing at the next step. The garments at this position are more or less damp—similar to what might result from sprinkling in home laundering—and the bucks are more or less heated from the pressing operations, which together with the time afforded by the rest period results in the conditioning of the garment for proper ironing or pressing, as above noted.

In position No. 3, the ironing or pressing takes place, and there is plenty of heat, which turns the moisture into steam which permeates the garment. This does not all dry out at this time, so that at the next step, the fourth, there is still considerable moisture in the garment.

The buck is still hot, however, and at this, the fourth, stop, which brings the garment out into the open and exposes it to the atmosphere, the steam and moisture still therein is given a chance to evaporate, assisted by the heated buck, and the garment becomes perfectly dry for removal when the turret turns to bring it to the No. 1, operator's, position, where it is removed and a new garment placed on the buck for treatment.

By this arrangement and the rest periods in the operation, no elaborate vacuum treatment of the garments is required after they issue from the press to prevent blistering in the heavier or more than one ply portions or to get rid of the moisture after pressing. Rest position No. 4 gives a chance to aerate the garment and uses natural forces to do it.

In this device, too, there is no locking of the buck and head together in the pressing position, but that is under the control of the operator at all times, to be varied at will according to the requirements of the particular garment being pressed. The bucks are not so large that the operator is required to walk around them more or less to arrange the garments thereon for pressing, or to require control pedals at different sides of the buck or machine to enable the operator to start the machine without first going back to her normal position.

The bucks 14 have stems or shanks on the under sides which slidingly fit into the upper ends of the pipe supports 15 and therefore may be changed for others if desired. They may be secured therein by set screws and be adjusted in height, if desired. These bucks, as usual, are preferably slightly convexed transversely on their upper pressing surfaces and the head correspondingly concaved on its lower surface. They may be made of suitable material, preferably of metal, and the pressing surface of the head may be covered with a suitable metallic screen to prevent the garment from getting glossy, and the buck may be covered with a pad consisting of a cloth cover with a metal or cotton cushion beneath. While these bucks may vary as a whole in size, it is preferred that they be about 21 inches long and 10 inches wide, and the head slightly larger, on which children's garments and the smaller parts and areas of other garments or articles, such as waists, sleeves and blouses, may be conveniently pressed, but which are too small to be pressed on the large presses with which the plants are equipped or on which it is inconvenient and uneconomical to do so. Besides, with bucks of about this size and the other parts of the machine in proportion, as shown, a simple, inexpensive and high-speed machine is produced, which takes up but little floor space, is safe and easy to operate, and at which the operator may sit down while operating it and away from the heat and steam of pressing and in no danger of contacting the heated head while draping the garments over the bucks or removing them therefrom; in which the garments may be more conveniently removed from the bucks and placed thereon than if under a head at the time; in which a short stroke of the pressing cylinder is made possible by not having to lift the heated head so high for changing garments on the buck beneath it, in which the head strokes are in a straight line perpendicular to the plane of the buck, for better pressing, and which fits into the usual line of laundry machines conveniently and efficiently to handle work not otherwise provided for.

While the head 17 is shown as electrically heated, it will be understood that steam may be employed as the heating means, the head being of the usual hollow construction and the steam connection thereto being of the flexible tubing in place of the conductor 29.

A suitable snap-on grid plate of finely perforated thin sheet metal covering the pressing face of the head may be applied to the head 17 to diffuse the heat and prevent deterioration of the material being pressed. Suitable cover pads may be applied to the pressing faces of the bucks 14.

Without further elaboration, the foregoing will so fully explain the gist of the invention that others may, by applying current knowledge, readily adapt the same for use under varying conditions of service, without eliminating certain features which may properly be said to constitute the essential items of novelty involved, which items are intended to be defined and secured by the following claim.

I claim:

A multiple-buck pressing machine comprising a supporting base, a supporting column rising therefrom, a rotatable sleeve on the lower part of said column extending from said base upwardly, a circular horizontal table mounted on the upper end of said sleeve and rotatable therewith, four pressing bucks mounted 90° apart on the upper side of said table with their outer edges substantially within the limits vertically of the peripheral edge of the table, a laterally projecting supporting arm on and adjacent the upper end of said column, a power-operated heated vertically reciprocable presser-head on said arm in vertical alignment with the said bucks when the bucks are brought serially beneath the head by the rotation of the table and co-operating therewith to press garments placed on the bucks, mechanism to rotate step by step said sleeve and table in 90° steps to carry the bucks around beneath the head, means to depress the head upon the bucks, and individual control means for the operator for said step-by-step mechanism and for said head, said control means being accessible to the operator of the machine from a position at the edge of said table diametrically opposite the presser head, the location and arrangement of the said parts enabling the operator while at said position to change the garments on the bucks and individually to control the operation of the table and the presser head, the intermediate stops of the table before and after the presser operation giving time for the conditioning of the garments on the bucks.

CARRIDON G. WESTWOOD.

REFERENCES CITED

The following references are of record in the file of this patent:

UNITED STATES PATENTS

| Number | Name | Date |
|---|---|---|
| 1,777,517 | Davis | Oct. 7, 1930 |
| 2,050,612 | Johnson | Aug. 11, 1936 |
| 2,050,618 | Mall | Aug. 11, 1936 |
| 2,202,483 | Dewey | May 28, 1940 |
| 2,431,123 | Kahn | Nov. 18, 1947 |

FOREIGN PATENTS

| Number | Country | Date |
|---|---|---|
| 189,813 | Germany | Oct. 18, 1907 |
| 263,000 | Great Britain | Dec. 23, 1926 |